United States Patent
Bullock

(10) Patent No.: US 8,950,526 B2
(45) Date of Patent: Feb. 10, 2015

(54) AC DRIVE SYSTEM FOR A VEHICLE

(75) Inventor: Keith J. Bullock, Queensland (AU)

(73) Assignee: Transport Energy Systems Pty Ltd, Queensland (AU)

( * ) Notice: Subject to any disclaimer, the term of this patent is extended or adjusted under 35 U.S.C. 154(b) by 0 days.

(21) Appl. No.: 13/883,242

(22) PCT Filed: Oct. 31, 2011

(86) PCT No.: PCT/AU2011/001399
§ 371 (c)(1),
(2), (4) Date: Aug. 21, 2013

(87) PCT Pub. No.: WO2012/058713
PCT Pub. Date: May 10, 2012

(65) Prior Publication Data
US 2013/0328393 A1    Dec. 12, 2013

(30) Foreign Application Priority Data

Nov. 2, 2010 (AU) ................................ 2010904882

(51) Int. Cl.
| | |
|---|---|
| *B60K 8/00* | (2006.01) |
| *B60R 16/033* | (2006.01) |
| *B60K 6/46* | (2007.10) |
| *B60K 6/547* | (2007.10) |
| *B60W 10/115* | (2012.01) |
| *B60W 10/30* | (2006.01) |

(52) U.S. Cl.
CPC ................ *B60R 16/033* (2013.01); *B60K 6/46* (2013.01); *B60K 6/547* (2013.01); *B60W 10/115* (2013.01); *B60W 10/30* (2013.01); *Y02T 10/6217* (2013.01)

USPC .................................. 180/54.1; 180/65.245

(58) Field of Classification Search
CPC .............. B60K 1/00; B60K 6/20; B60K 6/42; B60K 6/46; B60K 8/00
USPC .......... 180/65.21, 65.1, 65.22, 65.245, 65.27, 180/65.31, 53.5, 54.1
See application file for complete search history.

(56) References Cited

U.S. PATENT DOCUMENTS

| | | | |
|---|---|---|---|
| 4,113,045 A | 9/1978 | Downing, Jr. et al. | |
| 4,444,285 A * | 4/1984 | Stewart et al. | ............ 180/65.245 |
| 7,332,881 B2 * | 2/2008 | Clark et al. | .................... 318/139 |
| 7,520,354 B2 * | 4/2009 | Morrow et al. | ............ 180/65.31 |
| 7,560,882 B2 * | 7/2009 | Clark et al. | .................... 318/139 |
| 7,576,500 B2 * | 8/2009 | Patel et al. | ..................... 318/139 |
| 7,657,350 B2 * | 2/2010 | Moran | ..................... 180/65.245 |
| 7,673,713 B2 * | 3/2010 | Betz et al. | .................. 180/65.21 |
| 7,690,451 B2 * | 4/2010 | Chiao | .......................... 180/53.5 |

(Continued)

OTHER PUBLICATIONS

International Search Report for PCT application No. PCT/AU2011/001399, dated Feb. 1, 2012, 4 pages.

(Continued)

*Primary Examiner* — Hau Phan
(74) *Attorney, Agent, or Firm* — TraskBritt

(57) ABSTRACT

An AC drive method and system enables a more efficient and robust energy transfer in vehicles. The system includes an engine and a gearbox driven by the engine, wherein the gearbox has two or more gear ratios, an AC alternator is driven by the gearbox at a variable speed to generate an AC electric current that varies in both frequency and voltage as the speed of the alternator varies, one or more AC traction motors is then powered directly by the AC electric current from the AC alternator.

28 Claims, 6 Drawing Sheets

(56) References Cited

U.S. PATENT DOCUMENTS

| 8,120,291 | B2 * | 2/2012 | Clark et al. ................... 318/139 |
| 2008/0243324 | A1 | 10/2008 | Harris |

OTHER PUBLICATIONS

International Preliminary Report for PCT application No. PCT/AU2011/001399, dated May 16, 2012, 7 pages.

* cited by examiner

AC DRIVE SYSTEM FOR A VEHICLE

CROSS-REFERENCE TO RELATED APPLICATIONS

This application is a national phase entry under 35 U.S.C. §371 of International Patent Application PCT/AU2011/001399, filed Oct. 31, 2011, designating the United States of America and published in English as International Patent Publication WO 2012/058713 A1 on May 10, 2012, which claims the benefit under Article 8 of the Patent Cooperation Treaty and under 35 U.S.C. §119(e) to Australian Patent Application Serial No. 2010904882, filed Nov. 2, 2010, the disclosure of each of which is hereby incorporated herein by this reference in its entirety.

TECHNICAL FIELD

This invention relates to an AC drive system for vehicles such as locomotives or heavy trucks. In particular, although not exclusively, the invention relates to the generation of a variable voltage and variable frequency three-phase electric current for powering traction motors of industrial vehicles.

BACKGROUND

AC induction motors are widely used in drive systems of industrial vehicles such as locomotives or dump trucks. A drive system with AC induction motors geared to each axle of a bogie of the locomotive is considered to be the optimum drive system for locomotives. Similarly, AC induction motors are frequently used to drive the rear wheels of heavy mining trucks. The AC induction motors are also referred to as AC traction motors.

An alternating current, variable in both frequency and voltage, is required to effectively control the speed and power of the AC traction motors. A known method of generating such an alternating current is by the use of high-power electronic inverters using DC power from a DC link. The electrical power source for the DC link is usually rectified AC power from a diesel-powered generator set. A modern railway three-phase traction motor is controlled by supplying it with three variable-voltage, variable-frequency motor inputs from the inverter. The variations of the voltage and frequency are controlled electronically.

FIG. 1 shows the components of a traditional AC/AC locomotive drive system 10 with dynamic braking. A 3 MW diesel engine 12 is directly connected to a high-voltage three-phase alternator 14 to drive the alternator 14. The engine 12 also drives the locomotive accessories, namely air-conditioner, low-voltage alternator, air-compressor, engine and resistor grid cooling fans.

The alternator 14 generates a three-phase alternating current. The alternator 14 has a field controller 16 to generate the appropriate alternator voltage for a rectifier bank 18. The alternator 14 supplies the three-phase alternating current to the rectifier bank 18. The rectifier bank 18 converts the alternating current received from the alternator 14 to direct current.

The rectifier bank 18 charges a small capacity DC storage, referred to as the DC link 20. The DC link 20 supplies DC power to an inverter 22, which, in turn, produces a three-phase variable frequency, variable-voltage AC power for the traction motors 24. The inverter 22 operates in reverse electrical transfer mode during braking to generate power that is relayed to the resistor grid bank 26.

The traditional AC/AC locomotive drive system 10 generates AC power, which is rectified to DC power stored in a DC link, so that controlled variable voltage and frequency can be delivered to AC traction motors by an inverter of the DC power.

A control system (not shown) for the engine 12 and the alternator 14 ensures that the output power from the alternator 14 is sufficient to satisfy the power demand from the traction motors 24.

Control of the locomotive speed is obtained by monitoring the wheel speed of the locomotive and impressing a frequency demand on the inverter 22, which is between 2% and 5% greater than the wheel speed frequency. In braking, the inverter 22 produces a frequency lower than the wheel speed, the wheel torque being determined by the magnitude of the difference (slip). In order to generate the slip, a connection between the DC link (20) and the inverter (22) is needed but is not shown in FIG. 1.

During braking, all of the dynamic braking energy is dissipated in the resistor grid bank 26. The resistor grid bank 26 requires cooling, which is provided by fans driven by power from the engine 12. Thus, fuel is consumed during braking.

The traditional AC/AC drive system has a number of drawbacks, including:

a) When the vehicle is started and the frequency required by the AC traction motors is low (0.6 Hz), the distortion of the near zero frequency output of the inverter by the commutation (i.e., alternate switching each phase to positive and then to negative voltage) produces pulsations in the motor speed (referred to as "cogging"). This, in turn, leads to a lack of precision in the control of low vehicle speeds.

b) The traction power of the vehicle is controlled by the slip between the inverter frequency and the wheel speed, modulated by the square of the voltage. The magnitude of the slip applied to control the motor speed requires an accurate and rapid measurement of a small (5%) difference between two variables (sometimes 20 times larger than the slip).

c) The engine cannot act as a dynamic brake since there is no power link between the traction motors and the engine during braking.

d) Although efficient at full power, the high-current electronics nevertheless generate a substantial amount of heat, which creates a large demand for cooling power, especially in warm to hot climates.

e) The system has a large number of critical components, including a rectifier bank and inverter. Consequently, control of the system is complicated and, hence, the system may be prone to failure.

f) The constant rectification of AC current to DC current and then inverting back to AC current is not efficient. Traditional AC/AC drive systems suffer from significant power loss between the alternator and the traction motors due to the two energy-converting operations.

g) Size of components.

In order to make effective use of the torque speed characteristic of the AC traction motors throughout their entire speed range, it must be possible to obtain any desired frequency to match the speed of travel. For example, for frequencies between 20 and 120 Hz, the locus curve of the pull-out torque of a common traction motor is constant up to 40 Hz and, normally at this point, the AC/AC drive system reaches maximum power. It should be noted that for frequencies of up to 40 Hz, the supply voltage must increase in proportion to any rise in frequency.

For frequencies greater than 40 Hz, the voltage of the current supplied to the AC traction motors remains constant as it is constrained by the voltage of the DC link or by inverter electronics. For AC motors at a constant voltage, the locus curve of the pull-out torque decreases as the square of the speed. Thus, the power transferred reduces with increasing speed. The power drop-off can be reduced by use of larger motors that can produce more torque at the same voltage.

There is a need for an efficient and/or simple and/or robust temperature-tolerant AC drive system for industrial vehicles such as locomotives or heavy trucks. It would be preferable for such a system to be configured to use the engine as a sink of energy during braking and for the control system to control torque directly rather than speed.

DISCLOSURE

In one form, although it need not be the only or, indeed, the broadest form, the invention resides in an AC drive system for vehicles, the AC drive system comprising: an engine; a gearbox driven by the engine, wherein the gearbox has two or more gear ratios; an AC alternator driven by the gearbox at variable speed to generate an AC electric current, which varies in both frequency and voltage as the speed of the alternator varies; and one or more AC traction motors powered directly by the AC electric current from the AC alternator.

The AC alternator can generate a three-phase AC electric current. Consequently, the AC traction motors preferably operate on a three-phase AC electric current.

The gearbox may be an automatic gearbox.

The gearbox can include a reverse gear. The AC alternator can change the phase sequence of the electric current, either by a double relay, which interchanges two of the phases, or by using the reverse gear.

The AC alternator can include a field controller for controlling the voltage of the AC electric current.

The engine can be a diesel fuelled internal combustion engine.

The AC drive system may include a torque converter between the engine and the gearbox.

The AC drive system may include a resistor grid connected to the terminals of the AC traction motors for dissipating energy from the AC traction motors during braking.

In addition, the AC drive system may include a regenerative braking module driven by electrical power from the AC traction motors acting as generators during braking. The electrical power from the AC traction motors is converted to mechanical power by the alternator, which is then converted to electrical power by a generator to charge a battery pack. Excess electrical energy may be dissipated into a grid resistor at the same time as the battery pack is being charged.

The regenerative braking module may include a DC motor/generator connected to the gearbox. The regenerative braking module preferably includes a DC battery pack for storing electrical energy generated by the DC motor/generator during braking and the DC battery pack selectively supplies electrical energy to the DC motor/generator to drive the DC motor/generator during motoring.

Alternatively, the regenerative braking module may comprise an AC motor/generator, an inverter, and a DC battery pack. The AC motor/generator is preferably connected to the gearbox, and electrically connected to the inverter. The DC battery pack is preferably electrically connected to the AC motor/generator via the inverter. The DC battery pack stores electrical energy that is generated by the AC motor/generator during braking and supplied to the DC battery pack via the inverter. The AC motor/generator is selectively driven by electrical energy from the DC battery pack via the inverter when motoring.

The invention extends to a prime mover including the AC drive system as defined and described hereinabove.

The prime mover may be an industrial vehicle such as a locomotive or a heavy mining truck.

The AC traction motors may be mechanically connected to one or more axles of a locomotive bogie in order to drive the axles.

The AC traction motors may be mechanically connected to drive the wheels of the heavy mining truck.

A particular embodiment extends to a truck including the AC drive system as defined and described hereinabove. The invention also extends to a locomotive including the AC drive system as defined and described hereinabove.

In another form, an embodiment resides in a method of AC drive of vehicles such as trucks and locomotives, the method including: driving an AC alternator at variable speed and variable torque via a multi-speed gearbox to produce an AC electric current that is variable in frequency as the speed of the alternator varies; and powering AC traction motors with the AC electric current.

The method may include operating an engine to drive an input shaft of the gearbox at required speed and torque so that an output shaft of the gearbox drives the alternator at required speed and torque.

The method may also include varying the field current of the AC alternator to vary the voltage of the AC electric current.

In yet another embodiment, an AC drive system for vehicles includes a land-based battery off-board of the vehicle, and wherein the land-based battery is electrically connected to components of the AC drive system on-board the vehicle.

The land-based battery may electrically connect to a regenerative braking module of the AC drive system.

The AC drive system may also include a catenary for electrical connection of the land-based battery with the components of the AC drive system on-board the vehicle.

BRIEF DESCRIPTION OF THE DRAWINGS

By way of example only, particular embodiments of the invention will be described more fully hereinafter with reference to the accompanying figures, wherein.

DETAILED DESCRIPTION

Figure 1:
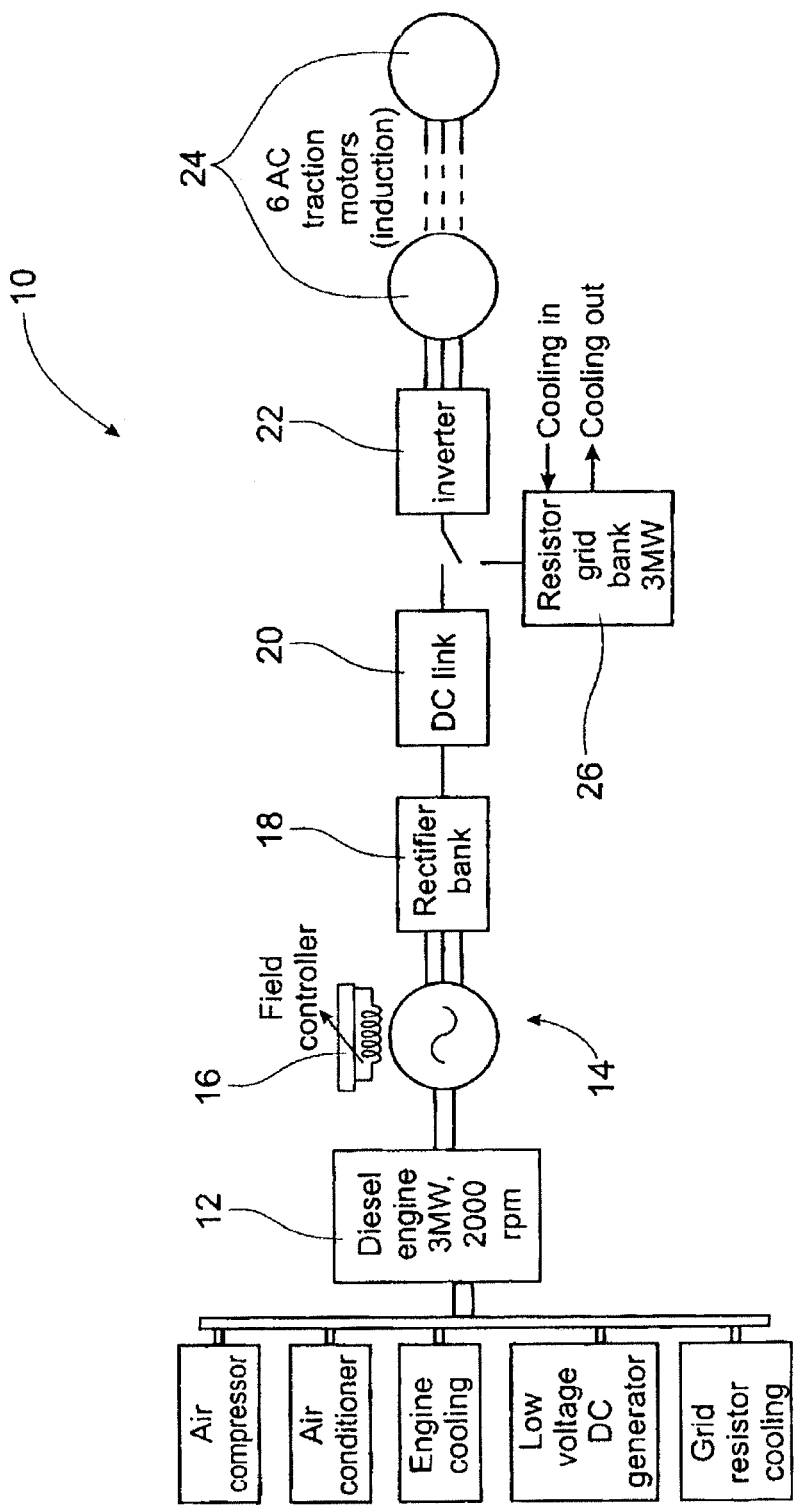
FIG. 1 is a schematic plan view of a prior art AC/AC drive system for vehicles.

Elements of the invention are illustrated in concise outline form in the drawings, showing only those specific details that are necessary to understanding the embodiments of the present invention, but so as not to clutter the disclosure with excessive detail that will be obvious to those of ordinary skill in the art, in light of the present description.

Words such as "comprises" or "includes" are not used to define an exclusive set of elements or method steps. Rather, such words merely define a minimum set of elements or method steps included in a particular embodiment of the present invention.

Figure 2:
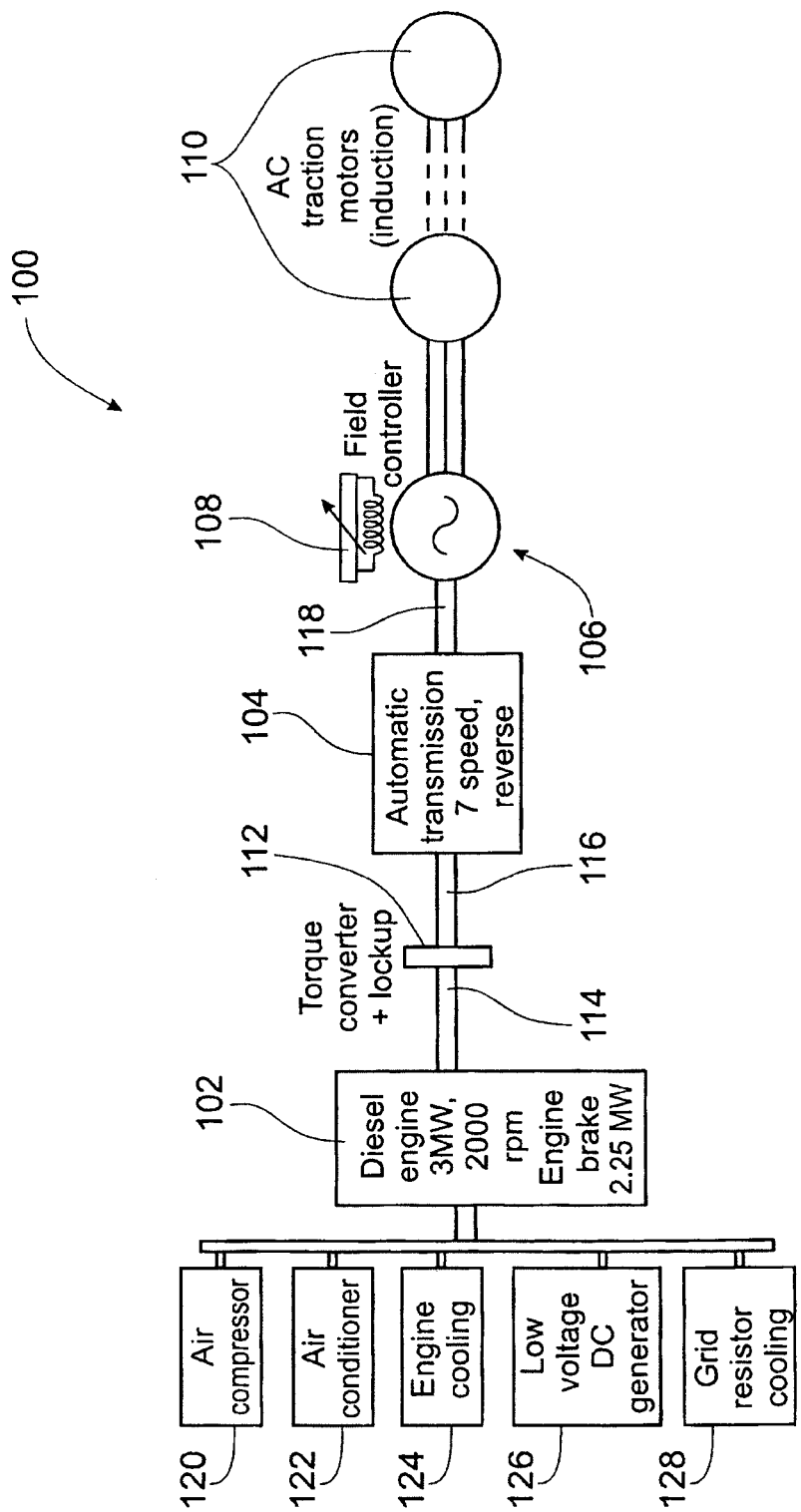
FIG. 2 is a schematic plan view of one embodiment of components of an AC drive system in accordance with the invention.

FIG. 2 shows one embodiment of an AC drive system 100 in accordance with the invention. Components of the AC drive system 100 comprise a diesel engine 102, a gearbox 104, an AC alternator 106 including a field controller 108, and AC traction motors 110. The diesel engine 102 is mechanically connected to the gearbox 104 via a lock-up torque converter 112. The system includes a control computer (not shown) for controlling gear selection of the gearbox 104 and current in the field winding of the alternator 106. The AC drive system 100 is for use with industrial vehicles such as a locomotive or heavy mining truck.

The engine 102 has a crank shaft 114 that drives the gearbox 104 via the torque converter 112. The gearbox 104 has an input shaft 116 connected to the torque converter 112. The torque converter 112 locks up, in use, so that the input shaft 116 of the gearbox 104 revolves at the same speed as the crank shaft 114 or output of the engine 102.

The engine 102 also drives auxiliaries such as an air compressor 120, air conditioner 122, engine cooling 124, low-voltage DC generator 126, and grid resistor cooling 128. The engine 102 can produce 3 Megawatts of power at 2000 rpm and has engine brake capacity of 2.25 Megawatts. The engine 102 is throttle-controlled by an accelerator pedal in the case of a truck or notch settings in the case of a locomotive.

The gearbox 104 is of the automatic mechanical transmission type, having seven forward gears and one reverse gear. The Applicant envisages that the gearbox 104 may alternatively be a continuously variable transmission gearbox. The gearbox 104 has an output shaft 118. The ratio between the input speed at the input shaft 116 of the gearbox 104 and the output speed at the output shaft 118 is governed by the gear ratios of the gearbox 104. The reverse gear effects a phase sequence change in the electric current from the alternator 106. The phase change makes the traction motors 110 operate in reverse when the gearbox is in reverse gear, which is useful in shunting operations of locomotives. The phase change can also be effected by a phase sequence change relay that is operable to interchange two of the three phases of the AC electric current, thereby powering the AC traction motors in reverse by switching of rotation of the field in the AC traction motors 110.

The alternator 106 is an AC electrical generator. The alternator 106 comprises a stator and a rotor. The rotor is the rotating part of alternator 106 and the stator is the stationary part of the alternator 106. The output frequency of electrical current generated by the alternator 106 depends on the number of poles and the rotational speed of the rotor. The rotor of the alternator 106 is connected to the output shaft 118 of the gearbox 104 such that the rotor rotates with the output shaft 118. The alternator 106 generates a three-phase alternating electrical current that is variable in frequency as a result of the variable speed of the output shaft 118 from the automatic gearbox 104. The voltage of the electrical current generated by the alternator 106 also varies with the variable speed of the output shaft 118.

Variable voltage of the three-phase current is modulated by the excitation field of the field controller 108 of the alternator 106. A control system of the AC drive system 100 maintains the voltage of the alternator 106 at as high a level as possible, while the slip is maintained between 2% and 5%. The slip is the difference in the synchronous speed (speed of the alternator rotor) minus the average of motor speeds divided by the synchronous speed. The voltage of alternator-generated current is controlled by both the alternator speed and the current in its field winding (which, in turn, is varied by the field controller 108). For a fixed current in the field winding, the alternator-generated voltage is directly proportional to the speed of the alternator rotor. This desirable voltage-speed relationship of the alternator 106 contrasts with the voltage constraint imposed by the DC link 20 and the engine speed 12 in FIG. 1.

The AC traction motors 110 are directly powered by the three-phase AC electric current from the alternator 106. The AC traction motors 110 consist of two basic parts, an outside stationary stator and an inside rotor. The outside stationary stator has coils supplied with the AC electric current from the alternator. 106 to produce a rotating magnetic field. The inside rotor is given a torque by the rotating field. The inside rotor is mechanically connected to drive wheels of the locomotive or truck.

The rotational speed of the rotating field in the stator of the AC traction motors 110 is directly proportional to the rotational speed of the output shaft 118 of the gearbox 104. The speed at which the drive wheels of the locomotive or dump truck turn may thus be controlled by the speed of the output shaft 118 of the gearbox 104. It will be appreciated that load on the drive wheels will increase the slip in the AC traction motors 110. Increased torque from the gearbox 104 may be required to rotate the magnetic field in the AC traction motors 110, thereby increasing the magnitude of the slip.

The AC drive system 100 operates to propel the vehicles via the traction motors 110. The vehicle speed is dependent on the terrain and the throttle position of the engine 102. Power from the engine 102 is increased or decreased by changing throttle position. Assuming a constant load on the AC traction motors 110, increased power output from the diesel engine 102 increases the speed at which the gearbox 104 drives the alternator 106 and subsequently increases the frequency of the current supplied to the AC traction motors 110.

The higher the frequency of the current, the faster the AC traction motors 110 will drive the wheels of the vehicle. Conversely, if the load on the AC traction motors 110 increases (due, for example, to the vehicle going uphill), more power is required from the engine 102 to maintain the vehicle at the same speed. The increase in load at the AC traction motors 110 is transmitted as an increase in load at the output shaft 118 of the gearbox 104, via the alternator 106. To maintain the required rotational speed of the output shaft 118, the automatic gearbox 104 may downshift a gear to increase the rotational speed of the input shaft 116 to the gearbox 104, leading to an increase in crankshaft 114 speed from the engine 102.

The gearbox 104 is a torque and speed converter for efficient operation of the engine 102 in supplying required speed and torque to the rotor of the alternator 106 during motoring. Similarly, the gearbox 104 is a torque and speed converter during braking for appropriate gear selection to slow the rotational speed of the rotor of the alternator 106 by engine braking. Dynamic braking of up to 2.25 MW (70% of the maximum engine power) can be achieved by the engine 102. The amount of braking can be modulated by the system's 100 control computer, which would effect a change to an appropriate gear within the gear box 104. If necessary, the retarding force during braking can be fine-tuned by changing the voltage of the three-phase current between the AC traction motors 110 and the AC alternator 106, which, in turn, changes the slip of the AC traction motors 110 at any alternator speed.

Figure 3:
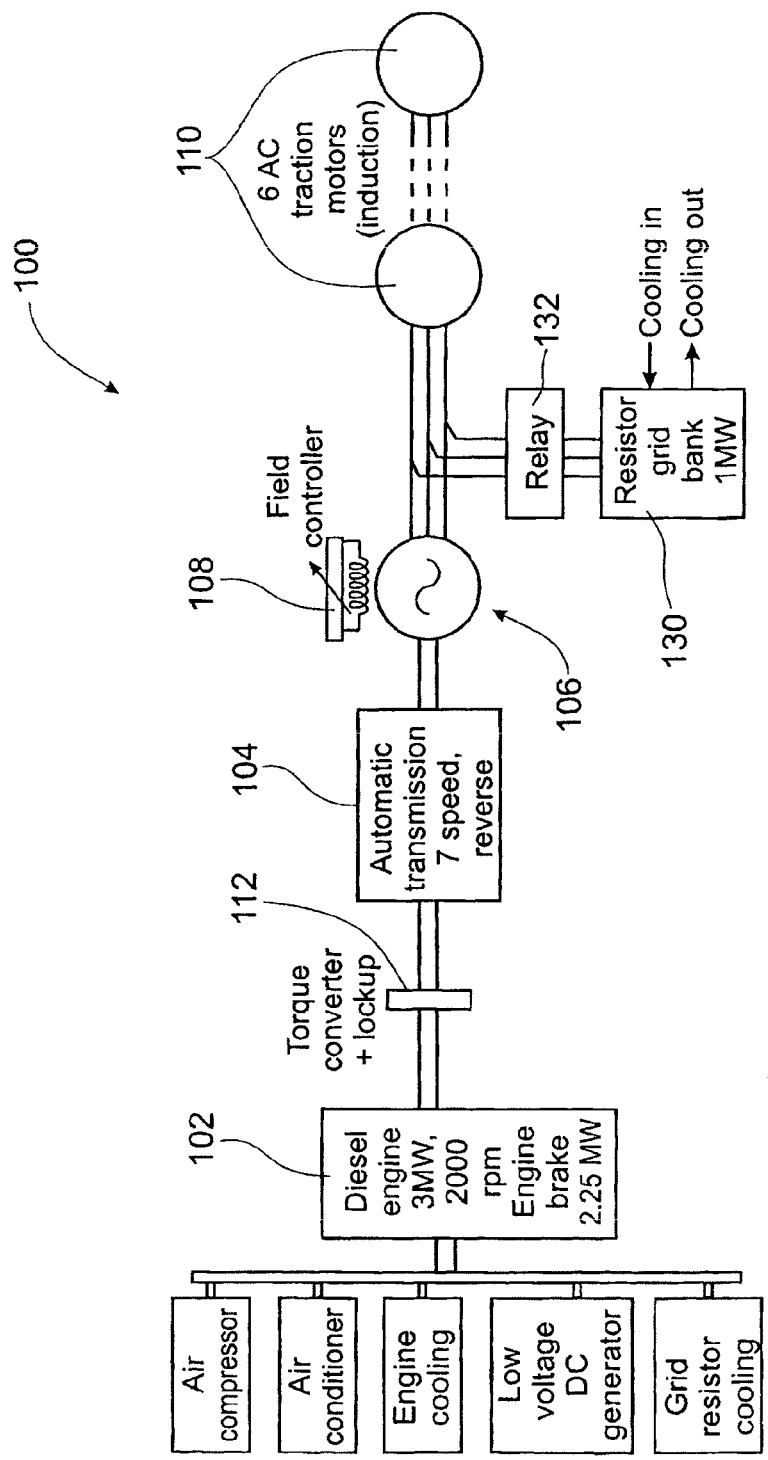
FIG. 3 is a schematic plan view of the AC drive system of FIG. 2, including a resistor grid bank for energy dissipating during braking.

FIG. 3 shows the AC drive system 100 of FIG. 2, including a resistor grid bank 130 for energy dissipation during braking.

The resistor grid bank 130 is electrically connected to the three-phase current from the AC traction motors 110, via a relay 132. Dynamic braking of up to 3.25 MW is achieved by a combination of engine exhaust braking and resistor grid 130 braking. The engine 102 provides 2.25 MW of braking, supplemented by 1.0 MW braking in the form of energy dissipated in the three-phase resistor grid bank 130. The relay 132 is selectively energized to connect the resistor grid bank 130 to the three-phase current generated by the AC traction motors 110 during braking.

By transferring most of the dynamic braking through the mechanical drive components in the reverse direction to the engine 102, the size of the resistor grid 130 is considerably reduced when compared to the traditional AC/AC drive system 10 of FIG. 1, where engine braking is not available.

Figure 4:
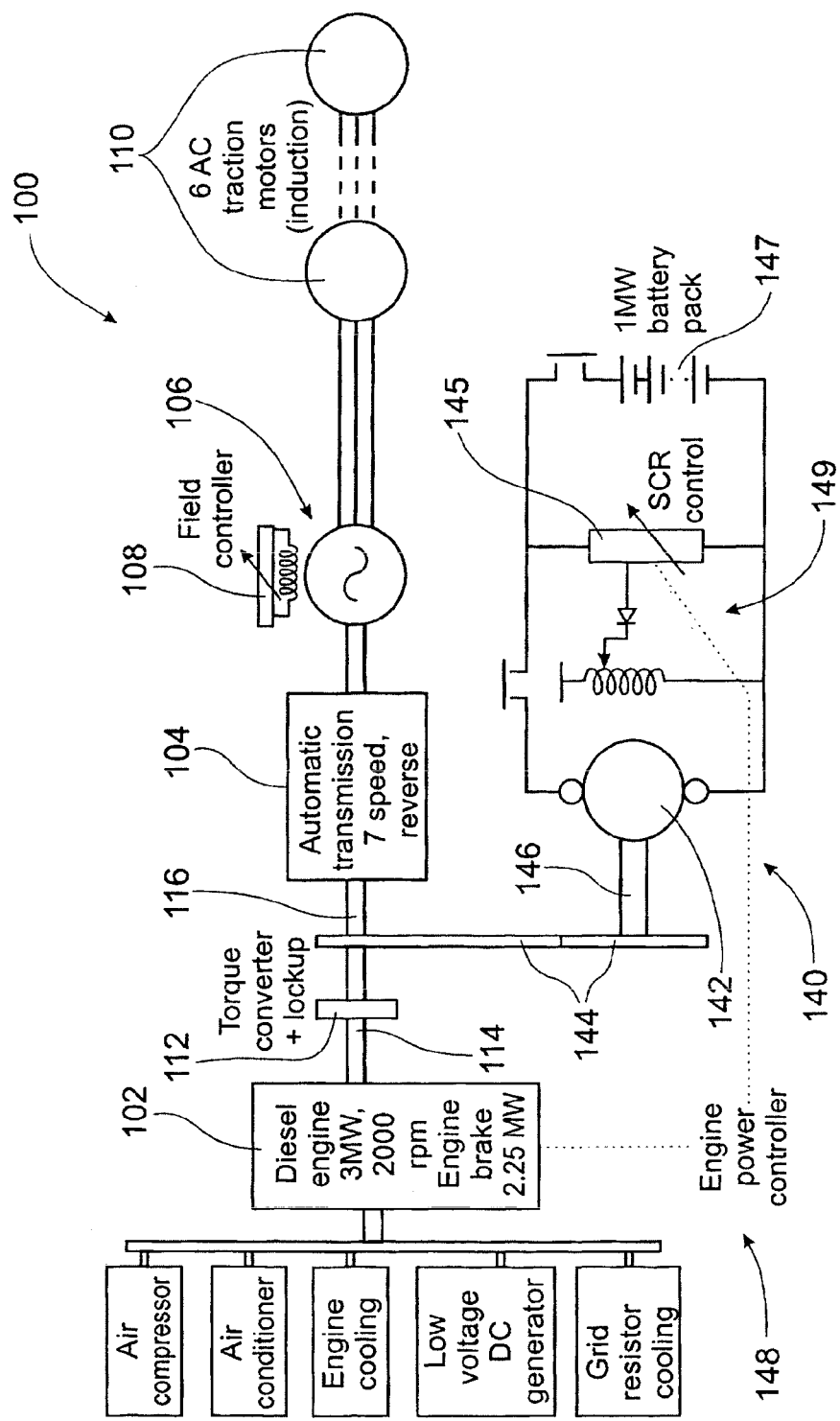
FIG. 4 is a schematic plan view of the AC drive system of FIG. 2, including a DC regenerative braking module.

FIG. 4 shows the AC drive system 100 of FIG. 2, including a DC regenerative braking module 140 component. The AC drive system 100 of FIG. 4 is a hybrid drive system, wherein power to drive the AC traction motors 110 is available both from the engine 102 and from the regenerative braking module 140.

The regenerative braking module 140 includes a DC motor/generator 142, a DC battery pack 147 and an SCR control field circuit 149. The motor/generator 142 is connected to the input shaft 116 of the gearbox 104 by a set of gears 144. A drive shaft 146 of the motor/generator 142 rotates with the input shaft 116 of the gearbox 104.

The regenerative braking module 140 stores electrical energy generated by the DC motor/generator 142 during braking. The DC battery pack 147 selectively supplies electrical energy to the DC motor/generator 142 to assist the engine in driving the gearbox 104 during motoring, thus saving fuel. An engine controller 148 manages the power requirements from the engine 102 and the regenerative braking module 140.

With the addition of an armature SCR controller (not shown), the regenerative braking module 140 can supply power to the drive system 100 of a locomotive for use in shunting operations. The gearbox 104 is set to first gear, the field current of the DC motor/generator 142 is set to maximum and the SCR control (not shown) in the armature circuit is used for speed control.

Figure 5:
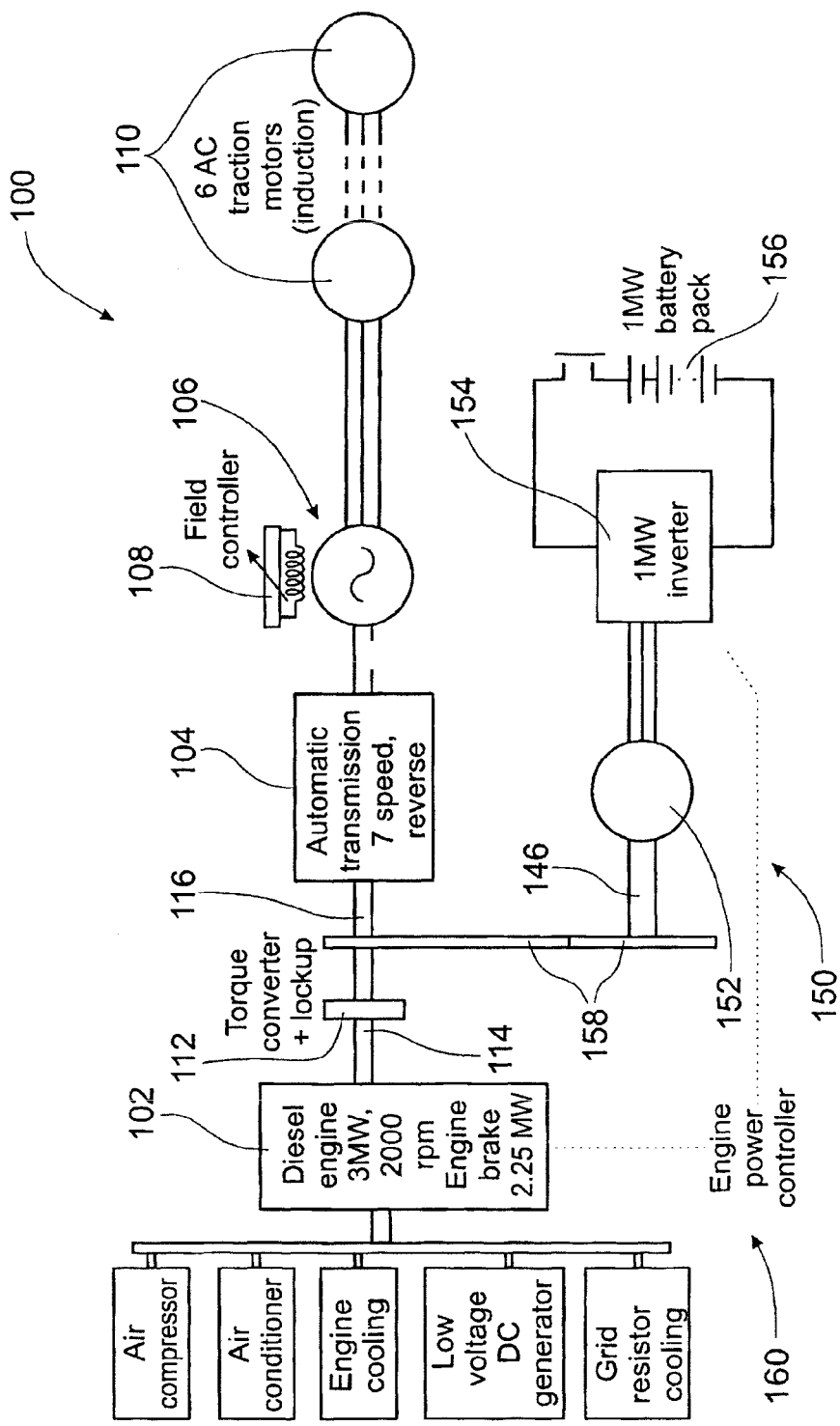
FIG. 5 is a schematic plan view of the AC drive system of FIG. 2, including an AC regenerative braking module.

FIG. 5 shows the AC drive system 100 of FIG. 2, including an AC regenerative braking module 150 component. The AC drive system 100 of FIG. 5 is also a hybrid drive system, similar to the DC drive system of FIG. 4.

The regenerative braking module 150 comprises an AC motor/generator 152, an inverter 154 and a DC battery pack 156. The AC motor/generator 152 is connected to the input shaft 116 of the gearbox 104 by a set of gears 158. The regenerative braking module 150 stores electrical energy generated by the AC motor/generator 152 during braking in the DC battery pack 156. AC current generated by the motor/generator 152 is rectified to DC current by the inverter 154 for charging the DC battery packs 156 and/or 159 (FIG. 6) during braking. The DC battery pack 156 selectively supplies electrical power to the AC motor/generator 152 via the inverter 154 to assist the engine 102 in driving the gearbox 104 during motoring. An engine controller 160 manages the power requirements from the engine 102 and the regenerative braking module 150.

The regenerative braking module 150 is suitable for shunting operations, as inverter 154 can control the speed and power delivered by the AC motor/generator 152 to the gearbox 104. A change in direction can be achieved either by a change in the phase sequencing of alternator 106, the inverter 154, or by the reverse gear in the gearbox 104.

Figure 6:
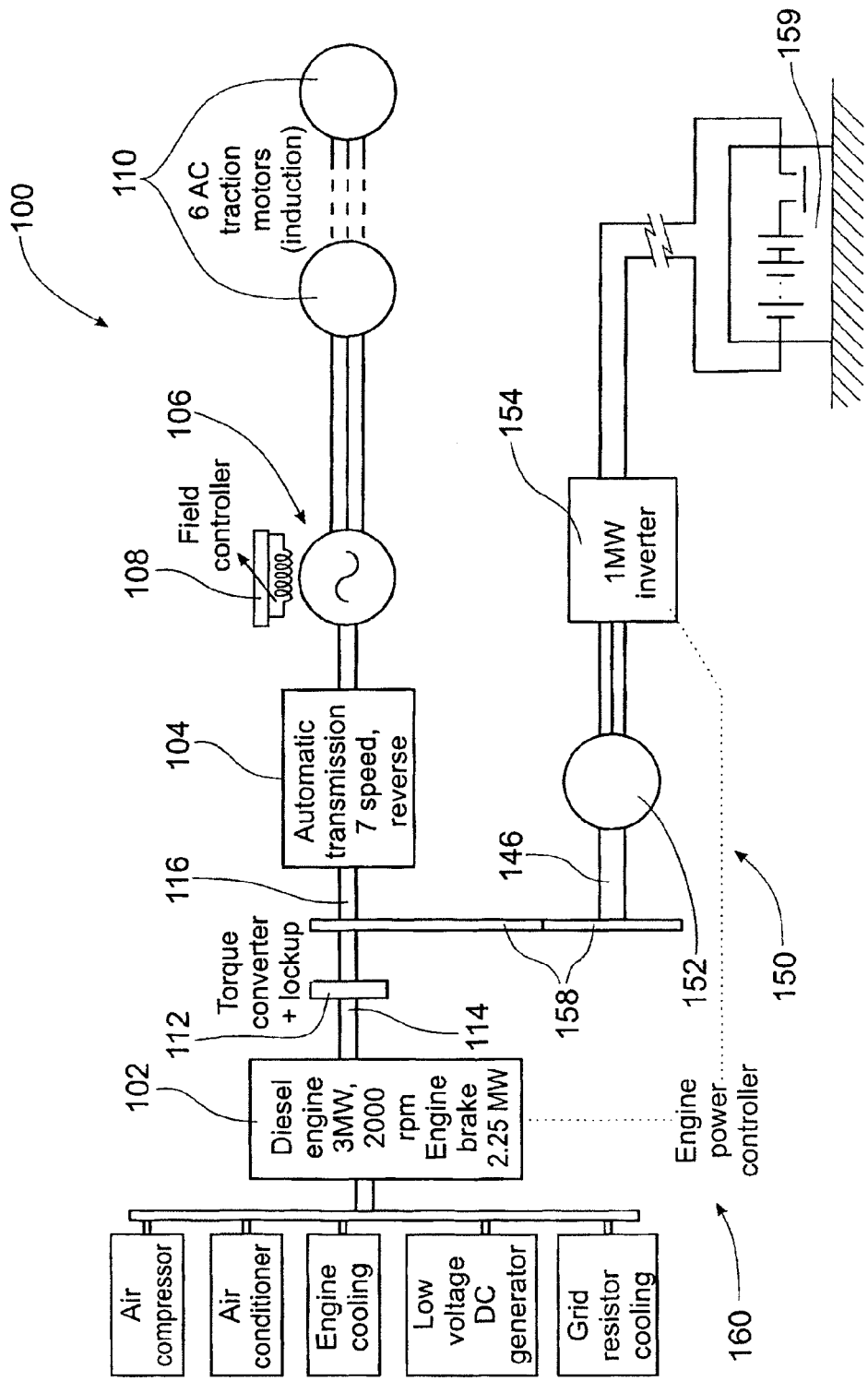
FIG. 6 is a schematic plan view of the AC drive system of FIG. 5, wherein the AC regenerative braking module includes a large land-based battery.

FIG. 6 shows the regenerative braking module 150 of FIG. 5 including a large land-based battery 159 instead of DC battery pack 156. The land-based battery 159 is off-board the vehicle. It must be appreciated that the land-based battery 159 may be additional to the DC battery pack 156. The battery 159 is in electrical contact with the inverter 154 via an overhead catenary of the AC drive system which carries high-voltage DC power via a roof-mounted pantograph to and from a locomotive and the large land-based battery 159.

Land-based catenaries have been used for supplying electrical energy to dump trucks during uphill travel. The electrical energy is usually supplied to the catenary from the mine electricity. However, the additional electrical energy is added to the voltage and current generated by the diesel generator in the mining dump truck. In the present invention, for both a hybrid locomotive and dump truck, the land-based battery power is transferred by a separate motor/generator 152 and added mechanically to the principal power path via the gearbox 104.

In operating the regenerative braking modules 140 and 150 of FIGS. 4 to 6, the AC drive system includes a PLC for control of the state of charge (SOC) of the battery packs 147, 156 and battery 159. A log of the battery amp hours in and out of the battery packs enables the PLC to calculate the state of charge (SOC) of the battery packs. One possible control strategy is as follows, but the specific control strategy will depend on the route profiles of the vehicles and the battery and drive system installed. If the SOC is greater than 80%, the regenerative braking modules will add power to the input shaft of the gearbox 104 to meet the desired speed of the vehicle. The PLC will maintain the battery SOC between 70% and 80% to meet the demands of the route topography. If the SOC drops below 70%, the PLC will instruct the gearbox 104 to shift to a lower gear. Further, if the route profile predicts that energy additional to that available from the engine would be required, the PLC will raise the engine speed to charge the batteries. In braking, the PLC will supply the maximum charge current to the battery packs 147, 156. Should this not provide sufficient braking or should the SOC approach the fully charged state, then the PLC will activate engine braking. Should engine braking and regenerative braking reach their maximum limit, then the mechanical brakes of the train or truck would be activated. If the vehicle is fitted with a resistor grid bank, the PLC of the vehicle may also apply dynamic braking via the resistor grid bank before activating the mechanical brakes.

Should the land-based battery 159 be included, and following the charging of batteries 147 or 156, the land-based battery 159 would serve the same purpose as batteries 147 or 156, but with an SOC level between 30% and 90%.

The AC drive systems 100 of FIGS. 2 to 5 provide a high-powered electrical drive system without the need for high-powered electronics such as an inverter or rectifier between the engine 102 and the AC traction motors 110. When compared to the traditional AC/AC drive system 10 shown in FIG. 1, the AC drive system 100 shown in FIG. 2 increases traction efficiency, provides for engine dynamic braking, and reduces maintenance costs. The AC drive system 100 also provides for the addition of a simple add-on regenerative braking module 140, 150 for hybrid operation.

The voltage to the AC traction motors 110 is not constrained by the voltage of a DC link or by inverter electronics as in the case of the traditional AC/AC drive system 10 of FIG. 1. The voltage of the AC drive system 100 is limited by the magnetic flux produced by the stator coils of alternator 106, together with the insulation resistance of the stationary coils of the AC traction motors 110 and the alternator 106. Thus, the normal reduction in the high-speed region of the torque speed characteristic for the traction motors 110 is dependent on the square of the voltage rather than on the square of the motor speed. Expressed in other terms, the high-speed region of the torque speed characteristic for the AC drive systems 100 reverts to a constant power function without the need to increase the size of the motors. This is best explained by examining the Thevenin theorem equivalent circuit for a three-phase induction motor, where the motor torque is given by the equation:

$$T = 3V^2 s/\omega_s r$$

This reduces to the following equation:

$$T = 3\left[\frac{V}{\omega_s}\right]^2 (\omega_s - \omega_m)/r$$

T=motor torque
V=alternator voltage
r=resistance of motor rotor
$\omega_s$=synchronous speed
$\omega_m$=motor speed
s=1−$\omega_m$/$\omega_s$=slip Thus, for constant T, V must vary linearly with synchronous speed ($\omega_s$). Synchronous speed ($\omega_s$) is directly proportional to the supply frequency of current to the motor. If V is constant, then T varies inversely with the square of the synchronous speed.

With a constant field current, the alternator 106, of FIGS. 2 to 5, automatically increases the voltage as the frequency, and hence, the synchronous speed, increases. Thus, the motor torque varies as the reciprocal of the synchronous speed, producing a constant power, high-speed region in the torque speed characteristic.

Dynamic braking of the traction motors 110 of the AC drive system 100 is obtained without the need for a large grid resistor, as both engine braking and regenerative braking are sinks for energy during braking. As a consequence, the cooling fan power requirements during braking are much reduced or eliminated.

The novel use of an automatic mechanical transmission between the engine 102 and the alternator 106 provides for the generation of the variable voltage and the variable frequency of the three-phase power for the traction motors 110, as described. Such a combination of components in the diesel generator eliminates the need for the rectifier bank, the DC link (storage), the high-powered solid-state electronic three-phase variable voltage, variable frequency inverter, and the associated cooling system. In addition, significant levels of dynamic braking can be achieved by using the engine as the sink of energy rather than using air-cooled electrical grids.

The system 100 for freight locomotives and for heavy mining dump trucks is more efficient, more robust (both mechanically and electrically), has fewer components and energy transfers, and enables a torque control of the power to be used. Advantages of the AC drive system 100 include reduced fuel usage, maintenance costs, cooling fan power, the size of the dynamic braking grids, both the number and the type of energy transfers, and the loss associated with each transfer (by better impedance matching of all components associated with the normal diesel-electric AC/AC drive). In addition, the size of the electric motors and the power of the inverter are kept to a minimum for high-speed operation above the corner frequency of the motors.

Throughout this specification, the aim has been to describe the invention without limiting the invention to any one embodiment or specific collection of features. Persons skilled in the relevant art may realize variations from the specific embodiments that will nonetheless fall within the scope of the invention.

What is claimed is:

1. An AC drive system for a vehicle, the AC drive system comprising:
    an engine;
    a gearbox driven by the engine, wherein the gearbox has two or more gear ratios;
    an AC alternator driven by the gearbox at variable speeds to generate an AC electric output that varies in both frequency and voltage as the speed of the alternator varies; and
    one or more AC traction motors powered directly by the AC electric output from the AC alternator.

2. The AC drive system of claim 1, wherein the AC alternator generates a three-phase AC electric current.

3. The AC drive system of claim 2, wherein the AC traction motors operate on the three-phase AC electric current.

4. The AC drive system of claim 2, wherein the gearbox includes a reverse gear to effect a phase sequence change of the electric output from the alternator, thereby powering the AC traction motors in reverse.

5. The AC drive system of claim 2, including a relay that is operable to interchange two of the three phases of the AC electric output, thereby powering the AC traction motors in reverse.

6. The AC drive system of claim 1, wherein the gearbox is an automatic gearbox.

7. The AC drive system of claim 1, wherein the AC alternator includes a field controller for controlling the voltage of the AC electric output.

8. The AC drive system of claim 1, wherein the engine is a diesel or gas-fuelled reciprocating or turbine internal combustion engine.

9. The AC drive system of claim 1, including a torque converter between the engine and the gearbox.

10. The AC drive system of claim 1, including a resistor grid electrically connected to the terminals of the AC traction motors for dissipating energy from the AC traction motors during braking.

11. The AC drive system of claim 1, including a regenerative braking module driven by electrical power from the AC traction motors acting as generators during braking.

12. The AC drive system as claimed in claim 11, wherein the regenerative braking module includes a DC motor/generator connected to the gearbox.

13. The AC drive system as claimed in claim 12, wherein the regenerative braking module includes a DC battery pack for storing electrical energy generated by the DC motor/generator during braking.

14. The AC drive system of claim 13, wherein the DC battery pack is land based relative to the vehicle.

15. The AC drive system of claim 14, wherein the AC drive system includes a catenary for electrically connecting the DC battery pack to the AC motor/generator or the DC motor/generator.

16. The AC drive system as claimed in claim 11, wherein the regenerative braking module includes an AC motor/generator, an inverter, and a DC battery pack.

17. The AC drive system as claimed in claim 16, wherein the DC battery pack is electrically connected to the AC motor/generator via the inverter.

18. A prime mover including the AC drive system of claim 1.

19. The prime mover as claimed in claim 18, wherein the prime mover is a locomotive.

20. The prime mover as claimed in claim 19, wherein the AC traction motors are mechanically connected to one or more axles of a locomotive bogie to drive the axles.

21. The prime mover as claimed in claim 18, wherein the prime mover is a heavy mining truck.

22. The prime mover of as claimed in claim 21, wherein the AC traction motors are mechanically connected to wheels of the heavy mining truck.

23. The AC drive system of claim 1, wherein the AC drive system includes a land-based battery off-board of the vehicle, wherein the land-based battery is electrically connected to components of the AC drive system on-board the vehicle.

24. The AC drive system of claim 23, wherein the AC drive system further comprises a regenerative braking module to which the land-based battery electrically connects.

25. The AC drive system of claim 23, wherein the AC drive system further comprises a catenary for electrical connection of the land-based battery with the components of the AC drive system on-board the vehicle.

26. A method of AC drive of vehicles such as trucks and locomotives, the method comprising:
    driving an AC alternator at variable speed and variable torque via a multi-speed gearbox to produce an AC electric output that is variable in frequency and voltage as the speed of the alternator varies; and
    powering AC traction motors with the AC electric output.

27. The method of claim 26, further comprising operating an engine to drive an input shaft of the gearbox at required speed and torque so that an output shaft of the gearbox drives the alternator at required speed and torque.

28. The method of claim 26, further comprising varying the field current of the AC alternator to vary the voltage of the AC electric output.

* * * * *

UNITED STATES PATENT AND TRADEMARK OFFICE
CERTIFICATE OF CORRECTION

PATENT NO. : 8,950,526 B2  Page 1 of 1
APPLICATION NO. : 13/883242
DATED : February 10, 2015
INVENTOR(S) : Keith J. Bullock It is certified that error appears in the above-identified patent and that said Letters Patent is hereby corrected as shown below:

In the claims:
CLAIM 22, COLUMN 11, LINE 10, change "mover of as claimed" to --mover as claimed--

Signed and Sealed this
Fifteenth Day of September, 2015

Michelle K. Lee
*Director of the United States Patent and Trademark Office*